US012250509B2

(12) United States Patent
Burgess et al.

(10) Patent No.: US 12,250,509 B2
(45) Date of Patent: Mar. 11, 2025

(54) DYNAMIC RESOURCE ALLOCATION

(71) Applicant: Cirrus Logic International Semiconductor Ltd., Edinburgh (GB)

(72) Inventors: Nigel Burgess, Edinburgh (GB); Andrew I. Bothwell, Edinburgh (GB)

(73) Assignee: Cirrus Logic Inc., Austin, TX (US)

( * ) Notice: Subject to any disclaimer, the term of this patent is extended or adjusted under 35 U.S.C. 154(b) by 187 days.

(21) Appl. No.: 17/958,014

(22) Filed: Sep. 30, 2022

(65) Prior Publication Data

US 2023/0032542 A1 Feb. 2, 2023

Related U.S. Application Data

(63) Continuation of application No. 17/388,258, filed on Jul. 29, 2021, now Pat. No. 11,546,685.

(60) Provisional application No. 63/060,270, filed on Aug. 3, 2020.

(51) Int. Cl.
*H04R 1/10* (2006.01)

(52) U.S. Cl.
CPC ....... *H04R 1/1041* (2013.01); *H04R 2420/07* (2013.01)

(58) Field of Classification Search
CPC .................................................... H04R 1/1014
See application file for complete search history.

(56) References Cited

U.S. PATENT DOCUMENTS 11,245,948 B2 2/2022 Lim et al.
2013/0251165 A1* 9/2013 Jorgensen ............ H04R 29/001 381/59
2014/0298309 A1* 10/2014 Proschowsky .......... G06F 8/654 717/170
2015/0078573 A1* 3/2015 Nicholson ................ H04R 1/10 381/74
2016/0036956 A1* 2/2016 Debates ............ H04M 1/72406 455/419
2017/0286091 A1* 10/2017 Jepson .................. G06F 9/4408
2018/0349126 A1 12/2018 Hempel
2019/0014423 A1 1/2019 Mebus
2019/0246161 A1 8/2019 Lim et al.
2019/0278556 A1* 9/2019 Usher ..................... G10L 15/22
2020/0310780 A1 10/2020 Chen et al.
2020/0336820 A1 10/2020 Tasaka
2021/0136479 A1* 5/2021 Yang ......................... G06F 8/65
2023/0112438 A1 4/2023 Burgess et al.

FOREIGN PATENT DOCUMENTS

EP 3561646 A1 10/2018
EP 3383002 A1 10/2019

OTHER PUBLICATIONS

Combined Search and Examination Report under Sections 17 and 18(3), UKIPO, Application No. GB2110954.1, mailed Dec. 20, 2021.

* cited by examiner

*Primary Examiner* — Simon King
(74) *Attorney, Agent, or Firm* — Jackson Walker L.L.P.

(57) ABSTRACT

A wearable device, comprising: one or more processors configured to: detect a wear status of the wearable device; and in response to the wear status, allocate resources of the wearable device to one or more functions of the wearable device.

15 Claims, 7 Drawing Sheets

DYNAMIC RESOURCE ALLOCATION

The present disclosure is a continuation of U.S. Non-Provisional patent application Ser. No. 17/388,258, filed Jul. 29, 2021, which claims priority to U.S. Provisional Patent Application Ser. No. 63/060,270, filed Aug. 3, 2020, each of which is incorporated by reference herein in its entirety.

TECHNICAL FIELD

The present disclosure relates to methods and apparatus for dynamic allocation of resources in wearable devices.

BACKGROUND

It is known to be advantageous to detect when wearable devices (such as headsets, earphones, smart watches, smart glasses etc.) are being worn, for example, when an earphone is located proximate to (on or in) the ear of a user.

Wearable devices are generally provided as battery-powered devices having a relatively small form-factor. Due to space, power, and design constraints, the operational resources available for operation of such devices (such as, for example, memory, data, control information, data and/or communication processors, power management and supply, etc.) may be limited. It is a challenge to balance the required functionality with the available operational resources for such wearable devices.

SUMMARY

According to a first aspect of the disclosure, there is provided a wearable device, comprising: one or more processors configured to: detect a wear status of the wearable device; and in response to the wear status, allocate resources of the wearable device to one or more functions of the wearable device.

The resources may comprise one or more of a memory and the one or more processors.

Reallocating resources may comprise selecting a firmware configuration from a plurality of firmware configurations to be loaded into the memory.

Detecting the change in wear status may comprise detecting whether the wearable device or part thereof is being worn by a user.

The wearable device may comprise a first headphone and a second headphone. In which case, the one or more processors may be configured to allocate the resources comprised in the first headphone and/or the second headphone.

The one or more processors may be configured to, on detecting that the first headphone and the second headphone are being worn by the user, allocate the resources between the first and second headphones.

The one or more processors are configured to, on detecting that the first headphone is being worn by the user and that the second headphone is not being worn by the user, allocate the resources of the first headphone to the one or more functions.

The pair of headphones may be true wireless stereo (TWS) earphones.

The one or more functions of the wearable device may comprise one or more of:

a. hearing augmentation;
b. voice recognition;
c. on-ear detection;
d. active noise cancellation;
e. transparency mode; and
f. passthrough.

The resources may comprise one or more of:

a. a memory;
b. a power supply;
c. protection circuitry;
d. an interface; and
e. one or more sensors.

The wearable device may comprise one or more of a smart watch, smart glasses, headphones, and headsets.

According to another aspect of the disclosure, there is provided a system, comprising: a wearable device; a host device communicatively coupled with the wearable device; and one or more processors comprised in one or more of the wearable device and the host device, the one or more processors configured to: detect a wear status of the wearable device; and in response to the wear status, allocate resources of the wearable device to one or more functions of the wearable device.

According to another aspect of the disclosure, there is provided a method of allocating resources of a wearable device, the method comprising: detecting a change in wear status of the wearable device; and in response to the detected change, allocate resources of the wearable device to one or more functions of the wearable device.

Reallocating resources may comprise selecting a firmware configuration from a plurality of firmware configurations to be loaded into the memory.

Detecting the change in wear status may comprise detecting whether the wearable device is being worn by a user.

The wearable device may comprise a first earphone and a second earphone. In which case, the one or more processors configured to: allocate the resources comprised in the first earphone and/or the second earphone.

The method may further comprise, on detecting that the first earphone and the second earphone are being worn by the user, allocating the resources between the first and second earphones.

The method may further comprising, on detecting that the first earphone is being worn by the user and that the second earphone is not being worn by the user, allocating the resources of the first earphone to the one or more functions.

The pair of earphones may be true wireless stereo (TWS) earphones.

The one or more functions of the wearable device may comprise one or more of:

a. hearing augmentation;
b. voice recognition;
c. wear detection;
d. active noise cancellation;
e. transparency mode; and
f. passthrough.

The resources comprise one or more of:

a. a memory;
b. a power supply;
c. protection circuitry;
d. an interface; and
e. one or more sensors.

According to another aspect of the disclosure, there is provided a wearable device, comprising: a memory; and one or more processors configured to: detect a change in wear status of the wearable device; and in response to the detected change, allocate resources of the wearable device to one or more functions of the wearable device.

According to another aspect of the disclosure, there is provided a wearable device, comprising: a plurality of resources, configured to: detect a change in wear status of the wearable device; and in response to the detected change, allocate one or more of the plurality of resources of the wearable device to one or more functions of the wearable device.

Throughout this specification the word “comprise”, or variations such as “comprises” or “comprising”, will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the present disclosure will now be described by way of non-limiting examples with reference to the drawings, in which.

DESCRIPTION OF EMBODIMENTS

Embodiments of the present disclosure relate to methods and apparatus for managing power consumption in a wearable device based on a wear status of the wearable device. As used herein, the term “wearable device” is any electronic device which is suitable for, or configurable, to be worn by a single user. Examples of such wearable devices include but are not limited to earphones, headphones, smart glasses, and smart watches.

A wear status may indicate whether the wearable device or a part thereof is being worn by a user. For example, where the wearable device is an earphone, the wear status may indicate whether the earphone is located on or in the ear. For example, where the wearable device is a pair of earphones or headphones, the wear status may indicate whether one or the pair of earphones is located on or in the ear or whether both of the pair of earphones is located on or in the ear. In another example, where the wearable device is a smart watch, the wear status may indicate whether the smart watch is being worn, for example on the wrist of the user. The smart watch may comprise one or more sensors (optical, infra-red etc.) which may be used to determine whether the watch is proximate the wrist of the user. In another example, where the wearable device is a pair of smart glasses, the wear status may indicate whether the smart glasses are being worn on the face of the user, or whether one or more earphones integrated into the smart glasses are located proximate (in or on) the ear(s) of the user.

Embodiments of the present disclosure are exemplified below with reference to a headphone configured to be worn in or on the ear of a user. It will be appreciated, however, that the present disclosure is not limited to application in a headphone. Embodiments of the disclosure are applicable to any wearable device as described above.

Figure 1:
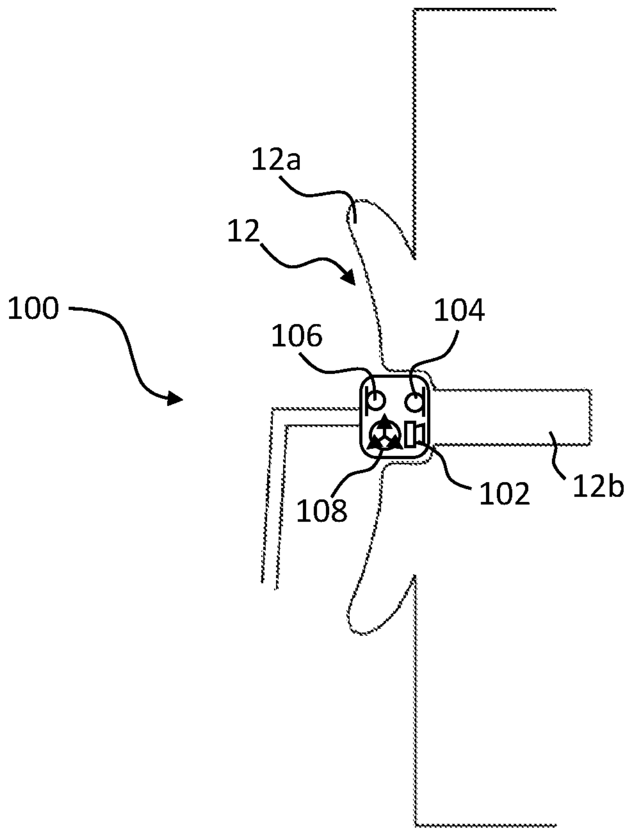
FIG. 1 is a diagram of a headphone located in an ear of a user.

FIG. 1 shows a schematic diagram of a user’s ear, comprising the (external) pinna or auricle 12*a*, and the (internal) ear canal 12*b*.

A wearable device comprising a headphone 100 (or earphone) sits inside the user’s concha cavity. The headphone 100 may fit loosely within the cavity, allowing the flow of air into and out of the user’s ear canal 12*b* which results in partial occlusion of the ear canal of the user. Alternatively, the headphone 100 may form a tight seal with the ear canal which may result in full occlusion.

The headphone 100 comprises one or more loudspeakers 102 positioned on an internal surface of the headphone 100 and arranged to generate acoustic signals towards the user’s ear and particularly the ear canal 12*b*. The headphone 100 may further comprise one or more microphones 104, known as error microphone(s) or internal microphone(s), positioned on an internal surface of the earphone, arranged to detect acoustic signals within the internal volume defined by the headphone 100 and the ear canal 12*b*. The headphone 100 may also comprise one or more microphones 106, known as reference microphone(s) or external microphone(s), positioned on an external surface of the headphone 100 and configured to detect environmental noise (or air-conducted sound) incident at the user’s ear.

The headphone 100 may be able to perform active noise cancellation (ANC), to reduce the amount of noise experienced by the user of the headphone 100. Active noise cancellation typically operates by detecting the noise (i.e. with a microphone) and generating a signal (i.e. with the loudspeaker) that has the same amplitude as the noise signal but is opposite in phase. The generated signal thus interferes destructively with the noise and so cancels or at least lessens the noise experienced by the user. Active noise cancellation may operate on the basis of feedback signals, feedforward signals, or a combination of both, i.e. a hybrid noise cancellation arrangement. Feedforward active noise cancellation utilizes the one or more microphones 106 on an external surface of the headphone 100, operative to detect the environmental noise before it reaches the user’s ear. The detected noise is processed, and the cancellation signal generated so as to inversely match the incoming noise as it arrives at the user’s ear thus cancelling, or at least reducing, the noise. Feedback active noise cancellation utilizes the one or more error microphones 104, also known as feedback microphones, positioned on the internal surface of the headphone 100, operative to detect the combination of the noise and the audio playback signal generated by the one or more loudspeakers 102. This combination is used in a feedback loop, together with knowledge of the audio playback signal, to adjust the cancelling signal generated by the loudspeaker 102 and so reduce or cancel the noise. The microphones 104, 106 shown in FIG. 1 may therefore form part of an active noise cancellation system, whether it be a feedforward, feedback or hybrid system implementing both feedforward and feedback ANC.

The headphone 100 may also operate in a passthrough or transparency mode in which sound incident at the microphone 106, positioned on an external surface of the headphone, is applied to the one or more loudspeakers 102 so that a user wearing the headset 100 is able to hear their ambient acoustic environment which has otherwise been occluded due to them wearing the headset 100 and therefore has ambient awareness.

In a variation, the headphone 100 may utilise the speaker 102 for one or more of feedback/feedforward/hybrid ANC, or passthrough. For example, the speaker 102 may be used as a sensor as is known in the art. The use of a speaker as a sensor is described in U.S. Pat. No. 10,506,336, the contents of which is hereby incorporated by reference in its entirety. Where the speaker 102 is used as a sensor, the internal microphone 104 may be omitted. It is noted that neither the speaker 102 nor the microphone 104 are essential to embodiments of the present disclosure.

The headphone 100 may further comprises an inertial measurement unit (IMU) 108, such as an accelerometer configured to measure inertia at the ear. Due to the fit of the headphone 100 in or on the ear 12, the IMU 108 may be mechanically coupled to the user's head. As such, the IMU 108 may be configured to pick up sound associated with the user speaking, conducted through the user's head via the bone-conduction path 16, so-called bone-conducted speech. In any of the embodiments described in this application, the IMU 108 may be replaced with another bone-conduction sensor operable to receive bone-conducted speech of the user conducted via the bone-conduction path 16. An example of a bone-conduction sensor is a contact microphone. For example, the internal microphone 104 may be operable as a bone-conduction sensor in some embodiments, such as when the internal microphone 104 is mechanically coupled to the head. In which case, the IMU 108 may be omitted and the functions of the IMU 108 may be undertaken by the internal microphone 104. In any case, detection of bone-conducted speech may be used to determine whether the headphone 100 is being worn by the user.

In the example shown in FIG. 1, a headphone 100 is provided as an example wearable device. It will be appreciated, as mentioned above, that embodiments of the present disclosure can be implemented on any wearable device which is configured to be worn by a user. Examples include circum-aural headphones worn over the ear, supra-aural headphones worn on the ear, in-ear headphones inserted partially or totally into the ear canal to form a tight seal with the ear canal, glasses (e.g. smart glasses) worn on the user's face, a smart watch worn on the wrist, virtual reality headsets, and augmented reality headsets. In such examples, a bone conduction sensor (such as the IMU 108 or a contact microphone) may be positioned at any location on the head, such as the nose bridge, the jaw, or the top of the head, provided they are able to pick up bone-conducted speech of the user.

The microphones 104, 106, the speaker 102 and/or the bone conduction sensor (such as the IMU 108) may be used (individually or in combination) to detect whether the wearable device is being worn by the user. Additional or alternative sensors, such as optical or infra-red sensors may be used to determine whether the wearable device is being worn.

Figure 2:
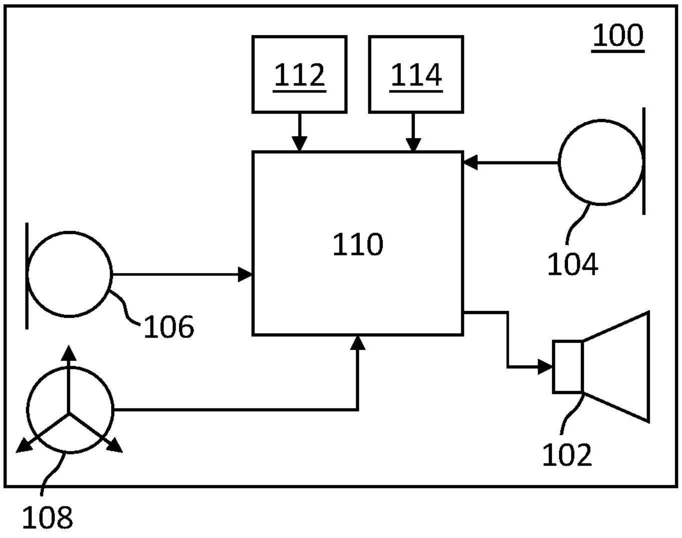
FIG. 2 is a block diagram of the headphone shown in FIG. 1.

FIG. 2 is a system schematic of the headphone 100. The headphone 100 may form part of a headset comprising another headphone (not shown) configured in substantially the same manner as the headphone 100. The pair of headphones (the headphone 100 and the other headphone which is not shown) may form a stereo headset, for example a True Wireless Stereo (TWS) headset. Functionality of the headset may be implemented by one or both of the pair of headphones. As such, operational resources of the pair of headphones may be shared between processes or functions of the headset, as will be described in more detail below. The pair of headphones may be configured to communicate with one another via a wired link or a wireless link, for example using Bluetooth (RTM).

A processor (or plurality of processors) 110 of the headphone 100 is configured to receive microphone signals from the microphones 104, 106 and the IMU 108 and output audio signals to the loudspeaker 102. When the headphone 100 is positioned at, near or within the ear canal, the microphone 104 is occluded to some extent from the external ambient acoustic environment. The headphone 100 may be configured for a user to listen to music or audio, to make telephone calls, to deliver voice commands to a voice recognition system, and/or other such audio processing functions. The processor 110 may be configured to implement active noise cancellation (feedback and/or feedforward) and/or pass-through/transparency modes using the microphones 104, 106 and the one or more transducers 102. The processor 110 may also configured to obtain biometric data from the IMU 108 and/or the one or more microphones 104, 106. The processor 110 may be configured to detect whether the headphone 100 is being worn by the user based on signals received from the IMU 108 and/or the one or more microphones 104, 106. The processor 110 may also be configured to manage power supplied by a power supply (not shown) of the headphone 100.

The headphone 100 further comprises a memory 112, which may in practice be provided as a single component or as multiple components. The memory 112 is provided for storing data and/or program instructions. The headphone 100 further may further comprise a transceiver 114, which is provided for allowing the headphone 100 to communicate (wired or wirelessly) with external devices, such as another headphone, and/or a host device, such as a mobile device (e.g. smartphone) for example, to which the headphone 100 is coupled. Such communications between the headphone 100 and external device(s) may comprise wired communications where suitable wires are provided between left and right sides of a headset, either directly such as within an overhead band, or via an intermediate device such as a mobile device and/or wireless communications (e.g. Bluetooth (RTM)). Where the headphone 100 is communicatively coupled with another similar headphone or device in a pair, operation of the pair of devices (headphones or otherwise) may be controlled by one or both of the devices in the pair or by a host device as described below with reference to FIG. 3.

The headphone 100 may be powered by an external or internal power source (such as a battery) and may comprise other sensors (not shown). The headphone 100 may also comprise one or more user interfaces (capacitive touch, face recognition etc.). The headphone 100 may also comprise one or more protection circuits (e.g. electrostatic discharge (ESD), speaker, thermal, current limit etc.). The processor 110 may be configured to control the one or more protection circuits. It will be appreciated that methods described herein may be implemented on the headphone 100 or on a host device to which the headphone 100 is connected, or a combination of both.

As mentioned above, the IMU 108 may be an accelerometer or gyroscope. The IMU 108 may be configured to output inertial measurements to the processor 110. The IMU 108 may form part of the headphone 100 as shown in FIG. 1. Alternatively, the IMU 108 may be a separate module in communication with the headphone 100, for example, via the transceiver 112. In some embodiments, for example where the headphone 100 is implemented as a headset worn on a user's head, the IMU 108 may be positioned away from the ear of the user when worn, for example on the nose bridge of a pair of smart glasses. The IMU 108 may be used to generate one or more signals representative of motion of the headphone 100 which may be used as a proxy for motion of the head of a user upon which the headphone 100 is being worn. Examples of motion include movement (forward, back, left, right, up, down) as well as tilt in any direction. A change in movement or tilt may also be derived from signals received from the IMU 108. Vibrations due to speech of the user, conducted via the bone-conduction path 16 in the user's head, may also be picked up by the IMU 108. Thus, the IMU 108 may be used to determine whether the headphone 100 is being worn by the user as well as one or more characteristics of the user's speech.

The headphone 100 described above thus provides audio playback to a user in use. Each headphone 100 may also be configured to detect whether the devices are being worn (i.e. wear detect), implement a virtual assistant (e.g. using one or more always-on-voice (AoV) trigger engine), perform active noise cancellation, implement hearing augmentation, implement transparency mode, implement sidetone adjustment. Performance of such techniques is known in the art and so will not be described in more detail here.

Whilst in the embodiment described above various processing functionality is implemented in a wearable device, such as that shown in FIG. 1, in other embodiments functionality of the headphone 100 may be implemented in an electronic, portable and/or battery powered host device such as a smartphone, an audio player, a mobile or cellular phone, a handset. Embodiments may be implemented on one or more integrated circuits provided within such a host device. In yet further alternatives, embodiments may be implemented in a combination of a host device and a wearable device. For example, embodiments may be implemented in one or more integrated circuits provided within the personal audio device, and one or more integrated circuits provided within the host device.

Figure 3:
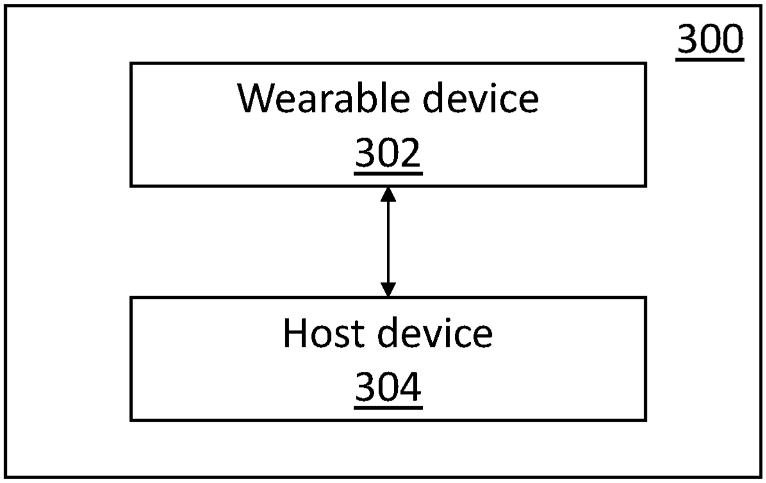
FIG. 3 illustrates an architecture comprising a wearable device and a host device.

FIG. 3 shows an example arrangement 300 according to embodiments of the disclosure. The arrangement 300 comprises a wearable device 302 such as the headphone 100 described above and a host device 304. The wearable device 302 may be any device which is suitable for, or configurable to be worn by a user. The host device 304 is coupled to the wearable device 302 and operative to control the wearable device 302 to perform one or more functions such as those described above with reference FIG. 1.

Wearable devices such as those described above (e.g. headsets, earbuds, smart watches, smart glasses, etc.) are generally provided as battery-powered devices having a relatively small form-factor. Due to space, power, and design constraints, the operational resources available for operation of such devices may be limited. Such operational resources include but are not limited to memory (RAM, ROM etc.), data, control information, data and/or communication processors, power management and supply, etc.), protection circuitry (ESD, speaker, thermal, current limit etc.). As such, it is a challenge to balance the required functionality (as described above) with the available operational resources for such wearable devices.

Embodiments of the present disclosure aim to address or at least ameliorate the challenges associated with limited operational resources by dynamically allocating such resources based on a wear status of the wearable device.

Figure 4:
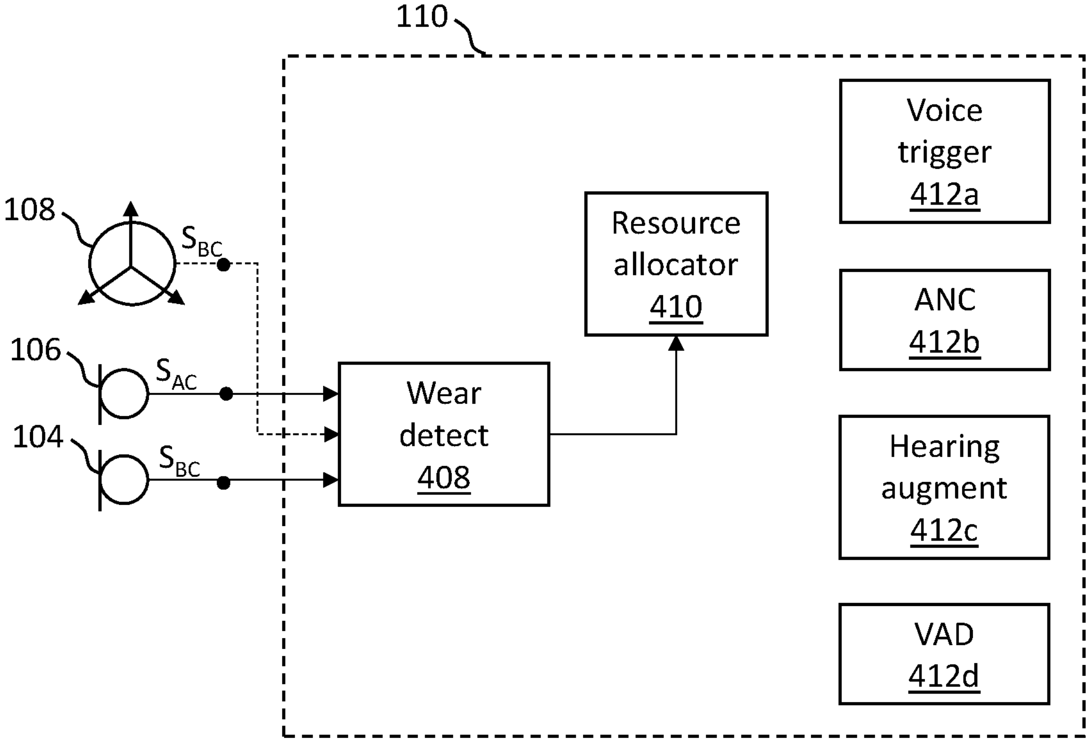
FIG. 4 is an example block diagram of a processor of the headphone of FIG. 2 according to various embodiments.

FIG. 4 illustrates an example implementation of the processor 110 in accordance with various embodiments of the present disclosure. In the example shown, the processor 110 is comprised in the headphone 100. However, it will be appreciated that the concepts described apply to any wearable device or group of wearable devices comprising one or more processors located in the wearable device(s) or in a host device or any combination thereof.

The processor 110 comprises a wear detect module 408 and a resource allocation module 410. The processor 110 may comprise other modules for performing other functionality. Such modules have been omitted from FIG. 4 to aid clarity. The processor 110 is configured to perform one or more processes 412 which each consume operational resources in the headphone 100. These processes may include but are not limited to a voice trigger process 412*a*, active noise cancellation 412*b*, hearing augmentation 412*c*, and voice activity detection 412*d*.

The wear detect module 408 is configured to detect whether the headphone 100 is on or in the ear (or more generally whether the headphone 100 is being worn). The on-ear detect module 408 may output an on-ear detect signal indicating whether or not the headphone is being worn (binary) and/or indicating a likelihood that the headphone 100 is being worn (or the personal audio device is being worn). The wear detect module 408 may receive an air-conduction signal $S_{AC}$ from the external microphone 106. The wear detect module 408 may additionally or alternatively receive a bone-conduction signal $S_{BC}$ which may be obtained from the IMU 108 or the internal microphone 104, or a mixture of both. The wear detect module 408 may determine that the headphone 100 is on or in the ear by determining a power or amplitude of the bone-conducted audio signal $S_{BC}$. For example, when the headphone 100 is located in the ear, the bone-conducted audio signal $S_{BC}$ received at the internal microphone 104 may have a relatively low power when the user not speaking (due to occlusion of the ear by the headphone 100 and thus a reduction in ambient noise reaching the internal microphone). In another example, the on-ear detect module 408 may apply an acoustic stimulus via the loudspeaker 102 and detect a response in the bone-conducted audio signal SBC picked up by the internal microphone 104 or the IMU 108. The response may be indicative of the headphone 100 being worn.

In some embodiments, the on-ear detect module 408 determines that the headphone 100 is being worn by comparing the air-conducted audio signal $S_{AC}$ to the bone-conducted audio signal $S_{BC}$. For example, if the headphone 100 is in the ear and the user is not speaking, the sound level or power in the bone-conducted audio signal $S_{BC}$ is likely to be lower than that in the air-conducted audio signal $S_{AC}$ due to partial or full occlusion of the ear by the headphone 100. Additionally or alternatively, any known method of detecting that the headphone 100 is being worn by the user may be used to determine that the headphone 100 is being worn, such as optical, pressure, temperature, heartbeat or the like picked up by one or more sensors embodied in the headphone 100 (or other wearable device).

A wear status is then output from the wear detect module 408 and provided to the resource allocation module 410. The wear status may be a binary status (worn or not worn) or a non-binary status (e.g. probability that the headphone 100 is being worn).

The resource allocation module 410 is then configured to allocate or reallocate operational resources based on the wear status from the wear detect module 408 (i.e. based on a determination as to whether the headphone 100 is being worn or not or if the probability that the headphone 100 is being worn exceeds a predetermined threshold).

The resource allocation module 410 may reallocate operational resources in a number of ways. Some non-exhaustive example of operational resource allocation are described below.

The resource allocation module 410 may reallocate or allocate operation resources based on the amount and distribution of operational resources across the wearable device. In some embodiments, reallocation may be performed to reduce overall power consumption, for example power consumption of the headphone 100 or a sub-system of the headphone 100 not being used. In which case, functions or processes may reallocated to resources of sub-systems of the device that are being used, such that other sub-systems can be shut down or placed in a low power mode.

In some embodiments, allocation may comprise selecting a firmware configuration to be loaded into the memory 112 of the headphone 100. For example, when the headphone is not being worn, the hearing augmentation and active noise cancellation processes 412*c*, 412*b* may not need to be running. As such, these processes may be disabled. In doing so, the firmware relating to these processes may be removed from the memory 112.

In the embodiment described above, the resource allocation module 410 is implemented by the processor 110 of the headphone 100. It will be appreciated, however, that the resource allocation module 410 may be implemented in another device, such as a host device communicatively coupled with the headphone 100 (e.g. the host device 304 shown in FIG. 3). Where the headphone 100 is provided as part of a pair of headphones, operation of the resource allocation module 410 may be a) implemented solely by one of the pair of headphones, or b) shared between the pair of headphones, or c) shared between a host device and one or more of the pair of headphones. Additionally or alternatively, the resource allocation module 410 may be duplicated in two or more devices (e.g. both headphones in a pair or a headphone and a host device).

As mentioned above, in some embodiments the wearable device may comprise multiple devices, such as a pair of headphones each headphone similar to the headphone 100 shown in FIGS. 1, 2 and 4.

Figure 5A:
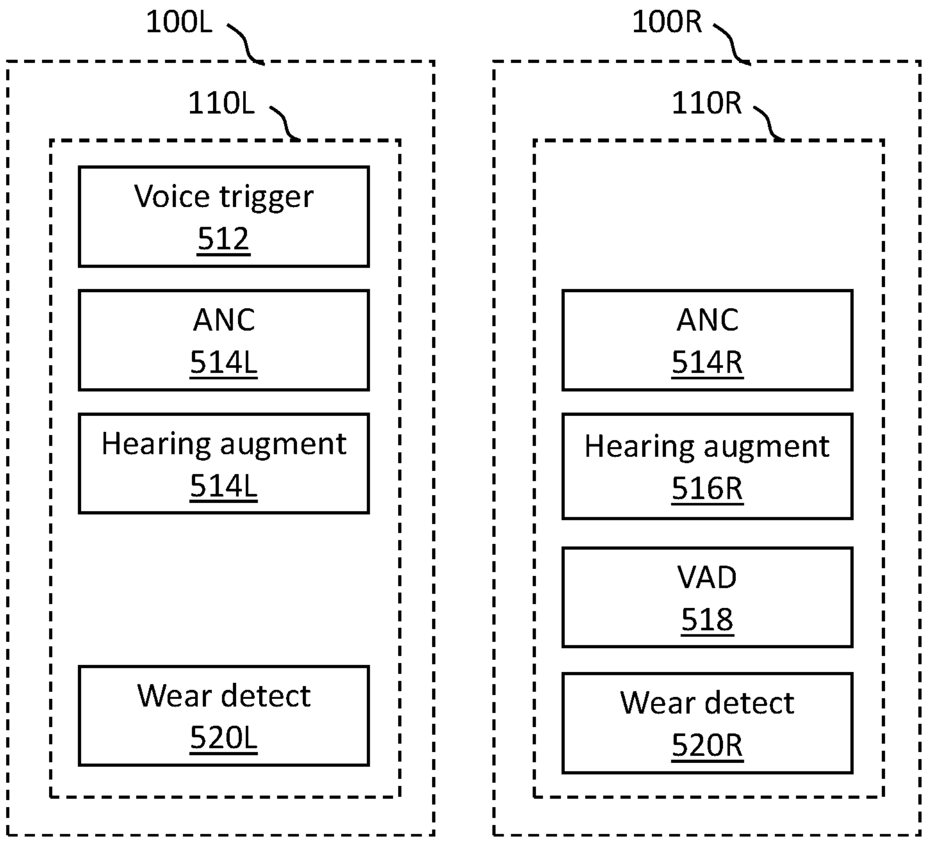
FIG. 5*a* is a schematic diagram of process allocation between left and right headphones of a pair of headphones both being worn by a user.
Figure 5B:
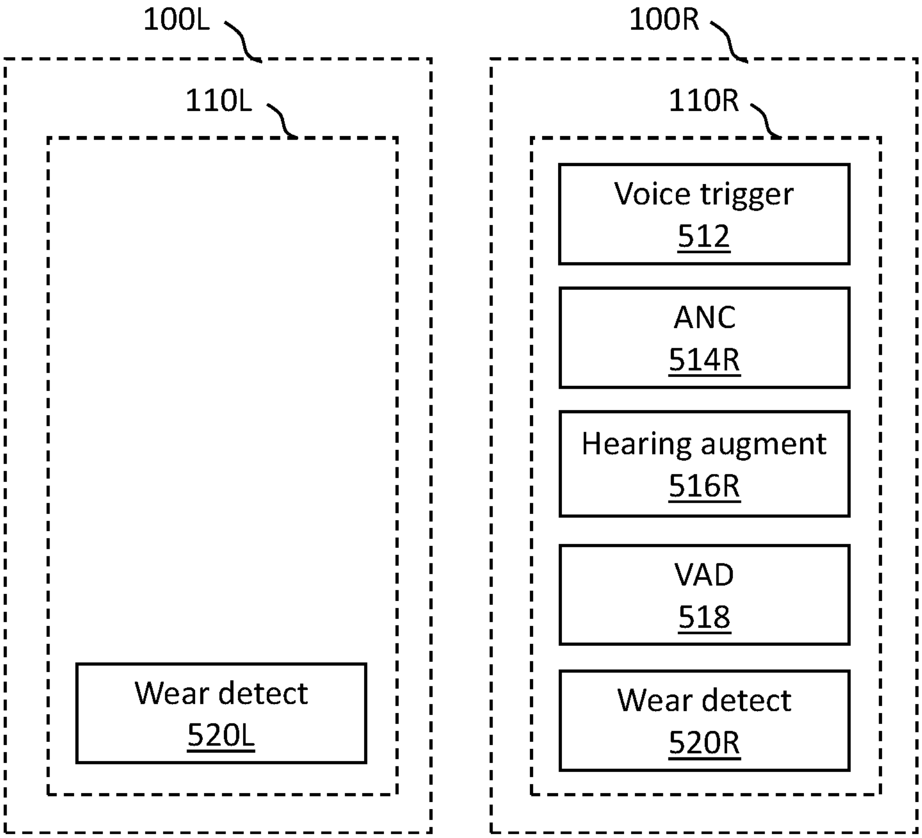
FIG. 5*b* is a schematic diagram of process allocation between left and right headphones of the pair of headphones shown in FIG. 5*a* when one headphone is being worn.

FIGS. 5*a* and 5*b* are a schematic illustration showing a plurality of processes being undertaken by various operational resources of left and right processors 110L, 110R of left and right headphones 100L, 100R, each headphone 100L, 100R similar to the headphone 100 shown in FIGS. 1 and 2. For clarity, various components and modules of the left and right headphones 100L, 100R (such as those shown in FIGS. 1, 2 and 4) have been omitted from FIGS. 5*a* and 5*b*.

FIG. 5*a* depicts an example resource allocation based on a determination that both of the left and right headphones 100L, 100R are being worn. The left processor 110L of the left headphone 100L is performing active noise cancellation (ANC) 514L and hearing augmentation (HA) 516L in respect of the left headphone 100L. Similarly, the right processor 110R is separately performing ANC 514R and HA 516R in respect of the right headphone 100R. It will be appreciated that in other embodiments a single ANC and HA process may be performed in respect of both left and right headphones 100L, 100R to which operational resources from one or both headphones 100L, 100 may be allocated. The left and right processors 110L, 110R are also running separate wear detect processes 520L, 520R for respective left and right headphones 100L, 100R, since each headphone 100L, 100R may be individually removed leaving the other of the headphones 100L, 100R worn (e.g. on or in the ear) by the user.

A single voice trigger process 512 is being operated on the left processor 110L and a single voice activity detect (VAD) process 518 is being operated on the right processor 110R (also in respect of the headset comprising the left and right headphones 100L, 100R). By allocating multiple different processes asymmetrically across multiple devices (in this case left and right headphones 100L, 100R) the efficiency of use of operational resources is increased. For example, less overall memory may be required for the headphones 100L, 100R to operate as a whole.

FIG. 5*b* depicts an example resource reallocation based on a determination that the left headphone 100L is not being worn and the right headphone 100R is being worn. It can be seen that the left ANC and HA processes 514L, 516L are no longer being performed by the left processor 110, since it is likely that the left headphone 100L may be occluded (held in a hand or placed in a case or pocket), such that any audio received at the left headphone 100L will likely not be usable for ANC or HA. Likewise, it can be seen that the voice trigger process 512 that was previously being performed by the left headphone 100L has been allocated to the right headphone 100R. As such, operational resources of the right headphone 100R have been reallocated to the voice trigger process 512 which was previously being handled by operational resources of the left headphone 100L. The left headphone 100L may continue to run a wear detect process 520L to monitor for a change in wear status of the left headphone 100L, e.g. insertion of placement of the left headphone 100L on or in the ear of the user.

As mentioned above, reallocation of operational resources may comprise loading new firmware into the memory of the left and/or right headphones 100L, 100R. Such firmware may load the voice trigger process 512, the ANC process 514R, the HA process 516R, the VAD process 518 and the wear detect process 520R into the memory of the right headphone 100R.

The left headphone 100L may optionally be switched off, in which case the wear detect process 520L may be disabled. Alternatively, the left headphone 100L may be placed in a low-power mode to conserve battery but to ensure the wear detect process 520L is still operating, albeit in a low-power mode of operation. Before switching off or being placed into the lower-power mode, the left headphone 100L may communicate with the right headphone 100R to load new firmware into the memory of the right headphone 100R, thus sharing operation resource associated with loading firmware into memory.

When the left headphone 100L is placed back on or in the ear (i.e. re-inserted) the headphones 100L, 100R may operate to load up new firmware appropriate for dual-headphone operation, for example, to load firmware equivalent to that shown in FIG. 5*a* into the relevant memory of the left and/or right headphones 100L, 100R.

Similarly, in the event that only one of the left and right headphones 100L, 100R is placed on or in the ear (from a state where neither of the headphones 100L, 100R are inserted), the initial firmware loaded into the headphone of the left and right headphones 100L, 100R placed on or in the ear may be equivalent to that shown in FIG. 5*b*.

It will be appreciated that the left and right headphones 100L, 100R may communicate with one another via their respective wired or wireless interfaces. For example, the left and right headphones 100L, 100R may communicate their respective wear statuses. Additionally or alternatively, outputs from the various processes implemented by the left and right headphones 100L, 100R may also be communicated to the other of the headphones 100L, 100R via their respective wireless interfaces.

In the above example, the wearable device consists of a pair of headphones 100L, 100R. Embodiments of the present disclosure are not, however, limited to such use cases. For example, the dynamic allocation of operational resources described herein is equally applicable to other devices such as smart glasses, smart watches and other types of personal audio devices. Additionally, dynamic allocation of operational resources may be implemented across any two or more wearable devices. For example, reallocation of resources may be performed between a headphone and a smart watch, a pair of smart glasses and a smart watch, a pair of smart watches to name a few non-exhaustive examples.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

Figure 6:
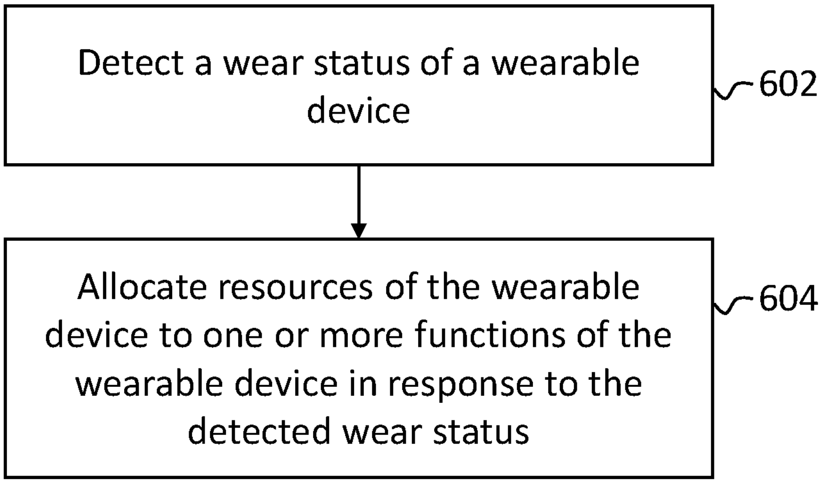
FIG. 6 is a flow diagram of a process according to embodiments of the disclosure.

FIG. 6 is a flow diagram of a process 600 which may be implemented by a wearable device or by a host device coupled to the wearable device. The wearable device may comprise the headphone 100 described above with reference to FIGS. 1, 2 and 4.

At step 602, a determination is made as to the wear status of the wearable device. In the example of the headphone 100, the determination may be made as to whether the headphone 100 or part thereof is on or in the ear of a user.

At step 604, in response to or based on the detected wear status, resources of the wearable device are allocated to one or more functions or processes to be performed by the wearable device.

A non-exhaustive list of example operational resources include memory (RAM, ROM etc.), data, control information, data, audio and/or communication processors, power management and supply, protection (electrostatic discharge (ESD), speaker, thermal current limit etc.), user interfaces (capacitive touch, face recognition etc.), sensors (accelerometer(s), gyroscope(s), biosensor(s), on ear detect sensor (s), optical, thermal etc.), other interfaces (data, audio, communications, computer bus, power, case sensing, universal serial bus (USB), USB-C, lightning etc.).

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog TM or VHDL (Very high speed integrated circuit Hardware Description Language). As the skilled person will appreciate, the code may be distributed between a plurality of coupled components in communication with one another. Where appropriate, the embodiments may also be implemented using code running on a field-(re) programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. A wearable device, comprising:
a first headphone;
a second headphone; and
one or more processors configured to:
detect a wear status of the wearable device, the wear status comprising that the first and second headphones are being worn by a user; and
in response to the wear status, allocate resources of the first and second headphones to one or more functions of the wearable device.

2. The wearable device of claim 1, wherein the resources comprise one or more of a memory and the one or more processors.

3. The wearable device of claim 1, wherein reallocating resources comprises selecting a firmware configuration from a plurality of firmware configurations to be loaded into a memory.

4. The wearable device of claim 1, wherein the one or more processors are configured to:
on detecting that the first headphone is being worn by the user and that the second headphone is not being worn by the user, allocate the resources of the first headphone to the one or more functions.

5. The wearable device of claim 1, wherein the first and second headphones are true wireless stereo earphones.

6. The wearable device of claim 1, wherein the one or more functions of the wearable device comprise one or more of:
a. hearing augmentation;
b. voice recognition;
c. on-ear detection;
d. active noise cancellation;
e. transparency mode; and
f. passthrough.

7. The wearable device of claim 1, wherein the resources comprise one or more of:
a. a memory;
b. a power supply;
c. protection circuitry;
d. an interface; and
e. one or more sensors.

8. The wearable device of claim 1, comprising one or more of a smart watch, smart glasses, headphones, and headsets.

9. A system, comprising:
a wearable device comprising first and second headphones;
a host device communicatively coupled with the wearable device; and
one or more processors comprised in one or more of the wearable device and the host device, the one or more processors configured to:
detect a wear status of the wearable device, the wear status comprising that the first and second headphones are being worn by a user; and
in response to the wear status, allocate resources of the first and second headphones to one or more functions of the wearable device.

10. A method of allocating resources of a wearable device comprising first and second earphones, the method comprising:
detecting a change in wear status of the wearable device, the change comprising that the first and second earphones are being worn by a user; and
in response to the detected change, allocate resources of the wearable device first and second earphones to one or more functions of the wearable device.

11. The method of claim 10, wherein reallocating resources comprises selecting a firmware configuration from a plurality of firmware configurations to be loaded into a memory.

12. The method of claim 10, comprising:
on detecting that the first earphone is being worn by the user and that the second earphone is not being worn by the user, allocating the resources of the first earphone to the one or more functions.

13. The method of claim 10, wherein the first and second earphones are true wireless stereo earphones.

14. A wearable device comprising first and second headphones, comprising:
a memory; and
one or more processors configured to:
detect a change in wear status of the wearable device, the change in wear status comprising that the first and second headphones are being worn by a user; and
in response to the detected change, allocate resources of the first and second headphones to one or more functions of the wearable device.

15. A wearable device comprising first and second headphones, comprising:
a plurality of resources, configured to:
detect a change in wear status of the wearable device, the change in wear status comprising that the first and second headphones are being worn by a user; and
in response to the detected change, allocate one or more of the plurality of resources of the first and second headphones to one or more functions of the wearable device.

* * * * *